Figure 1:
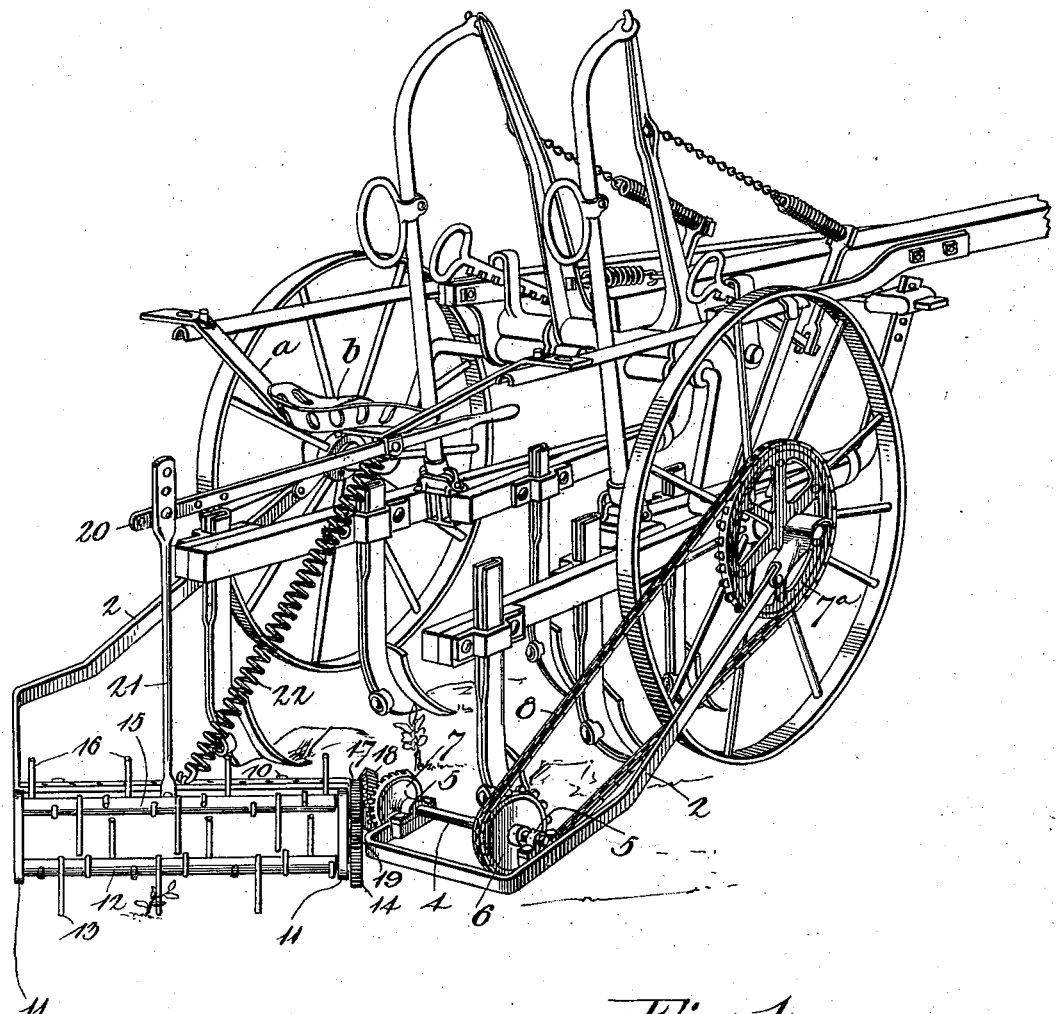

No. 692,729. Patented Feb. 4, 1902.
J. STINE.
ATTACHMENT FOR CULTIVATORS.
(Application filed Nov. 4, 1901.)

(No Model.) 3 Sheets—Sheet 1.

Witnesses Joseph Stine, Inventor.

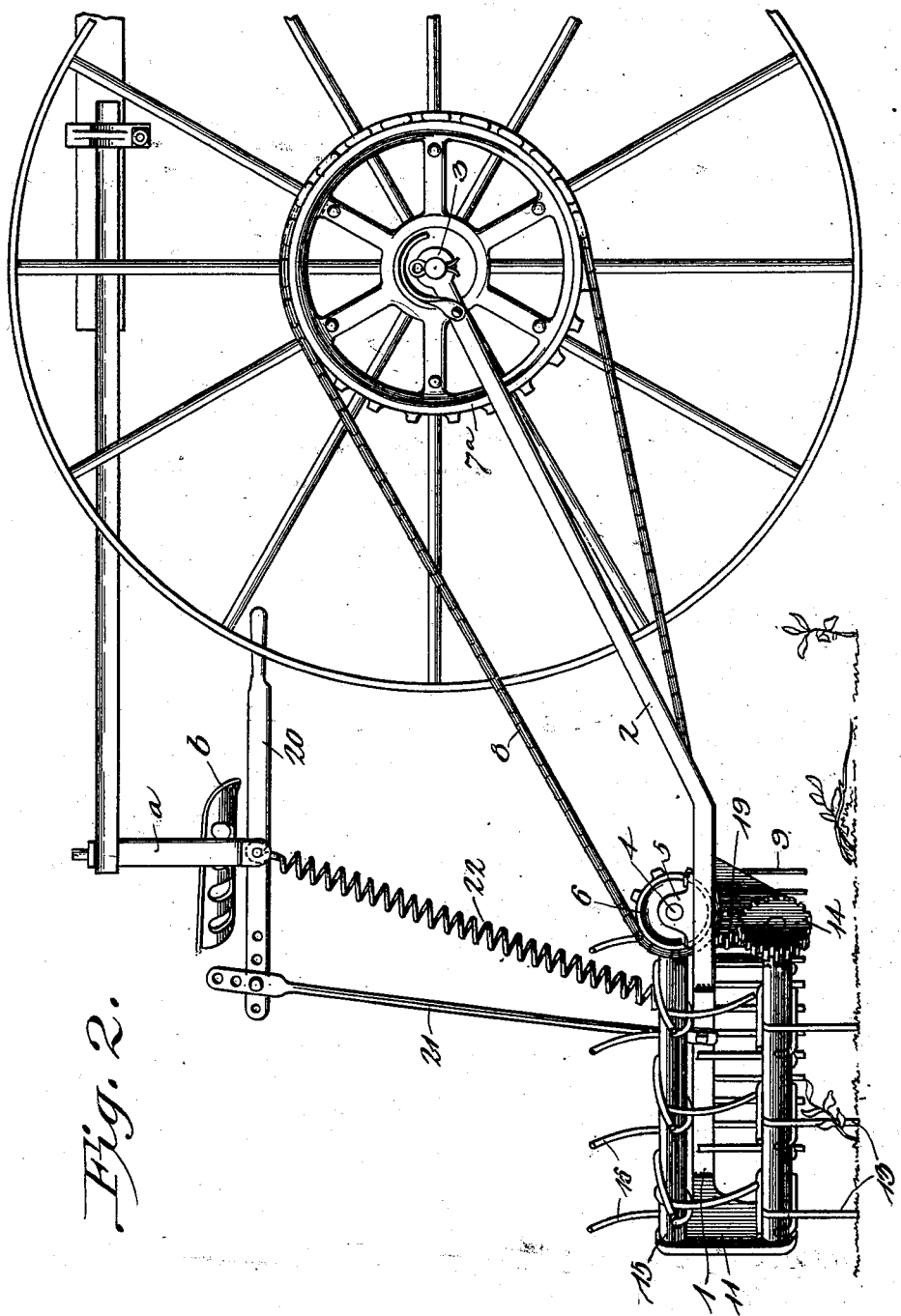

No. 692,729. Patented Feb. 4, 1902.
J. STINE.
ATTACHMENT FOR CULTIVATORS.
(Application filed Nov. 4, 1901.)
(No Model.) 3 Sheets—Sheet 3.
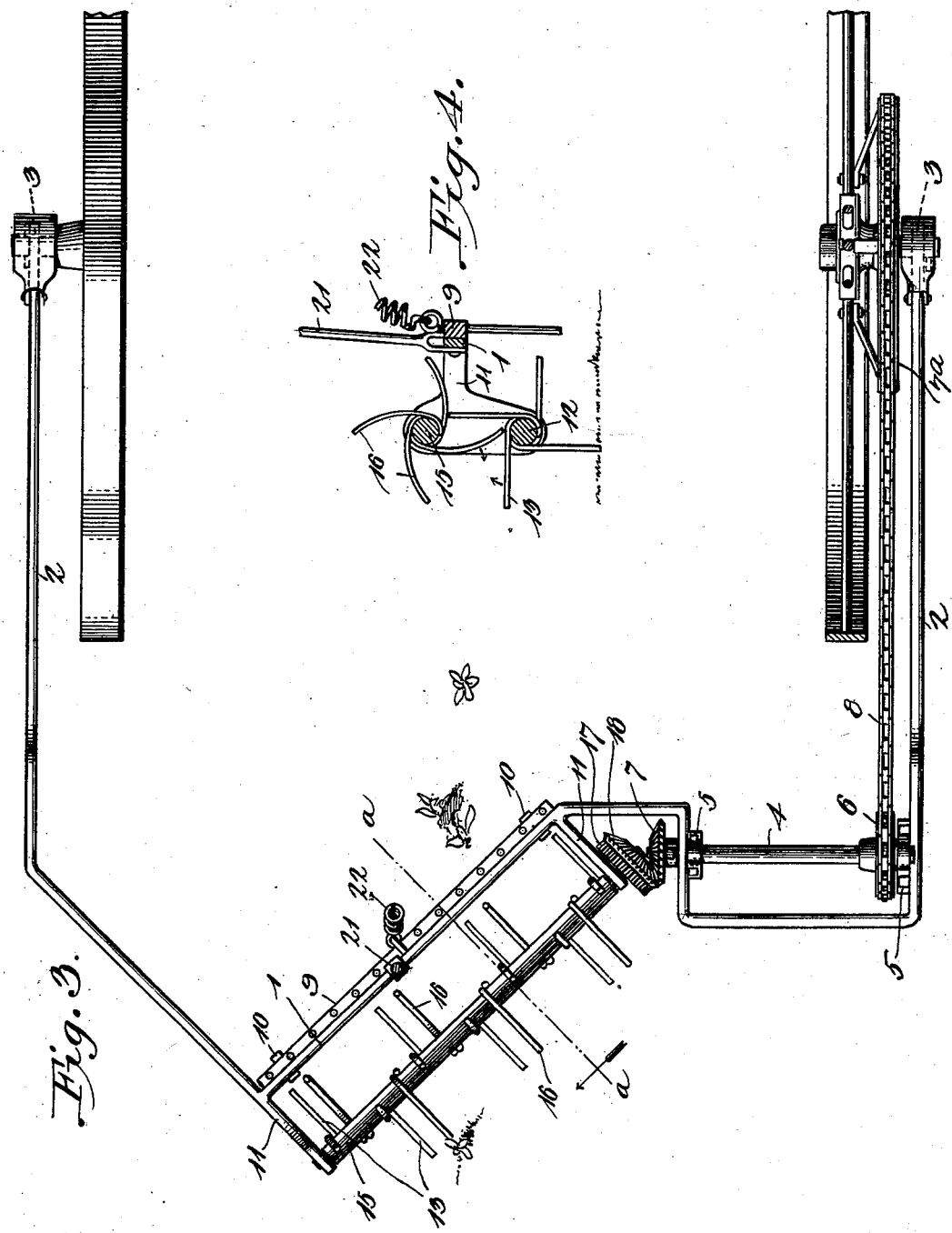
Witnesses Joseph Stine, Inventor.
by C. A. Snow & Co.
Attorneys

UNITED STATES PATENT OFFICE.

JOSEPH STINE, OF SAYBROOK, ILLINOIS.

ATTACHMENT FOR CULTIVATORS.

SPECIFICATION forming part of Letters Patent No. 692,729, dated February 4, 1902.

Application filed November 4, 1901. Serial No. 81,146. (No model.)

*To all whom it may concern:*

Be it known that I, JOSEPH STINE, a citizen of the United States, residing at Saybrook, in the county of McLean and State of Illinois, have invented a new and useful Attachment for Cultivators, of which the following is a specification.

My invention is an improved attachment for cultivators, especially adapted for use in connection with sulky-cultivators for uncovering such plants in the rows as become covered by the earth thrown upon them by the plows; and it consists in the peculiar construction and combination of devices hereinafter fully set forth and claimed.

In the accompanying drawings, Figure 1 is a perspective view of my improved plant-uncovering attachment, showing the same disposed in operative relation to a sulky-cultivator. Fig. 2 is a side elevation of the same. Fig. 3 is a top plan view of the same. Fig. 4 is a transverse sectional view of the same, taken on a plane indicated by the line $a\,a$ of Fig. 3.

In the embodiment of my invention here shown I employ a frame 1, which is obliquely disposed with relation to the row of plants on which it operates and is provided at its ends with supporting-arms 2, the front ends of which are provided with bearings 3, whereby the said arms are pivotally connected to the axle-spindles of the sulky-cultivator, as shown.

In the frame 1, at one side of the obliquely-disposed portion thereof, is disposed a counter-shaft 4, which is journaled in suitable bearings 5, with which the said frame is provided. Said counter-shaft has a sprocket-wheel 6 at its outer end and a beveled gear-wheel 7 at its inner end. I provide a sprocket-wheel 7ª, which is attached to one of the supporting-wheels of the sulky-cultivator and rotates therewith, and the power from said wheel 7ª is conveyed to the sprocket-wheel 6, and hence to the counter-shaft 4, by an endless sprocket-chain 8, which connects the said wheels 6 and 7ª.

On the front side of the oblique portion of the frame 1 is secured a rake 9, which is vertically adjustable on the said frame 1 and is here shown as provided with clamping-bolts 10, by means of which it may be secured at any desired vertical adjustment. The frame 1 is provided with rearwardly-extending arms 11, which are at right angles to and on the rear side of the oblique portion of said frame 1. In the said arms are bearings for a revoluble plant-lifting and clod-removing element, which is here shown as a shaft 12, having tangential spurs 13, which are disposed spirally thereon. On one end of the shaft 12 is a spur-gear 14. Above the revoluble plant-lifting and clod-removing element is a clearing element, which is here shown as a shaft 15, having its bearings in the arms 11 and provided with a series of radial curved spirally-disposed clearing-spurs 16, which are intercurrent with the tangential spurs 13 of the revoluble plant-lifting and clod-removing element. At one end of the shaft 15 is a spur-wheel 17 and a beveled gear 18. The latter engages the gear 7 of the counter-shaft 4, and hence motion is communicated from said counter-shaft to said revoluble clearing element. An idler-gear 19, which is mounted on a suitable stub-shaft that projects from one of the arms 11, engages the gears 14 17, and hence power is also communicated to the revoluble plant-lifting and clod-removing element.

It will be understood that owing to the pivotal connection between the arms 2 of the frame and the axle-spindles of the cultivator my improved attachment may be lowered to the ground and caused to operate in rear of the cultivating-plows and obliquely across the rows of plants and that my said attachment may be raised from the ground when it is not desired or necessary that the same shall operate.

In order to raise and lower the attachment, I provide a lever 20, which is fulcrumed at a suitable point to the sulky-cultivator and is here shown as fulcrumed below the bar $a$, which supports the driver's seat $b$. The rear end of the said lever is connected by a rod 21 to the frame 1. A lift-spring 22, which is here shown as a coiled retractile spring, has one end connected to the frame 1 and the opposite end connected to a suitable fixed point, here shown as the fulcrum of the lever 20. This spring is in practice sufficiently powerful to raise the attachment about eight inches from the ground and to normally maintain the same in such elevated position. When a plant becomes covered by the action of the plows, which can be observed by the driver, the latter by operating the lever 20 causes the attachment to descend, and the action of the revoluble plant-lifting and clod-removing element is such as to remove the clods from over the covered plant and to lift the latter, thereby preventing it from being destroyed, as will be readily understood. The rake which is disposed in advance of the plant-lifting and clod-removing element prevents large or coarse trash from coming in contact with the latter, and the revoluble clearing element, the spurs of which are intercurrent with those of the plant-lifting and clod-removing element, keeps the latter from becoming clogged by the lighter trash and removes the same therefrom.

I do not desire to limit myself to the precise construction and combination of devices herein shown and described, as it is evident that modifications may be made therein without departing from the spirit of my invention.

Having thus described my invention, I claim—

1. In combination with a cultivator having soil-stirring devices disposed for operation on the sides of a row, a revoluble plant-lifting and clod-removing element disposed for operation on the row, substantially as described.

2. The combination with a cultivator having soil-stirring devices disposed for operation on the sides of a row, of a revoluble plant-lifting and clod-removing element in rear thereof and disposed obliquely with relation to the line of draft and over the row, the said revoluble plant-lifting and clod-removing element being provided with spurs, substantially as described.

3. The combination with a cultivator having soil-stirring devices disposed for operation on the sides of a row, of a revoluble plant-lifting and clod-removing element, disposed for operation in rear thereof and over the row and provided with spirally-disposed spurs, substantially as described.

4. The combination with a cultivator having soil-stirring devices disposed for operation on the sides of a row, of a revoluble plant-lifting and clod-removing element, in rear thereof and disposed obliquely with relation to the line of draft and over the row, the said revoluble plant-lifting and clod-removing element being provided with spirally-disposed spurs, substantially as described.

5. The combination, in a machine of the class described, of a revoluble plant-lifting and clod-removing element having spurs, and a revoluble clearing element having spurs intercurrent with those of said revoluble plant-lifting and clod-removing element, substantially as described.

6. In a machine of the class described, the combination of a frame, a rake on the front side thereof, a revoluble plant-lifting and clod-removing element in rear of said rake, and a revoluble clearing element above said revoluble plant-lifting and clod-removing element, the said last-mentioned elements being provided with intercurrent spurs, substantially as described.

7. In a machine of the class described, the combination of a frame, a rake on the front side thereof, a revoluble plant-lifting and clod-removing element in rear of said rake, a revoluble clearing element above said revoluble plant-lifting and clod-removing element, the said last-mentioned elements being provided with intercurrent spurs, and means for rotating said elements in the same direction, substantially as described.

8. In combination with a cultivator having soil-stirring devices disposed for operation on the sides of a row having a power-wheel, a frame disposed in rear of the cultivator and having a revoluble plant-lifting and clod-removing element disposed over the row, and connections, between the latter and said power-wheel, whereby said element is rotated, substantially as described.

9. In combination with a cultivator having soil-stirring devices disposed for operation on the sides of a row, a plant-lifting and clod-removing element disposed for operation in rear of the cultivator and over the row, and means to raise and lower said element, substantially as described.

10. In combination with a cultivator having soil-stirring devices disposed for operation on the sides of a row, a plant-lifting and clod-removing element disposed for operation, in rear of the cultivator and over the row, a spring to normally raise said element, and a lever to depress the same against the tension of said spring, substantially as described.

11. A plant-lifting attachment for sulky-cultivators comprising a frame having means whereby it may be pivotally connected to the cultivator, and disposed in rear thereof, a counter-shaft in said frame, means to convey power to said counter-shaft from one of the wheels of the cultivator, a revoluble plant-lifting and clod-removing element carried by said frame and power connections between said element and said counter-shaft, substantially as described.

12. A plant-lifting attachment for sulky-cultivators, comprising a frame having means whereby it may be pivotally connected to the cultivator, and disposed in rear thereof, a counter-shaft in said frame, means to convey power to said counter-shaft from one of the wheels of the cultivator, a revoluble plant-lifting and clod-removing element carried by said frame, a revoluble clearing element carried by said frame, said plant-lifting and clod-removing and said clearing elements being provided with intercurrent spurs, means to convey power from said clearing element to said plant-lifting element, and means to convey power from said counter-shaft to said clearing element, substantially as described.

In testimony that I claim the foregoing as my own I have hereto affixed my signature in the presence of two witnesses.

JOSEPH STINE.

Witnesses:
GEO. M. NELSON,
JOHN M. ENGLER.